Aug. 8, 1933.  J. W. PATTERSON  1,921,094
BATH SPRAY OR LIKE CONNECTER
Filed March 7, 1932  2 Sheets-Sheet 1
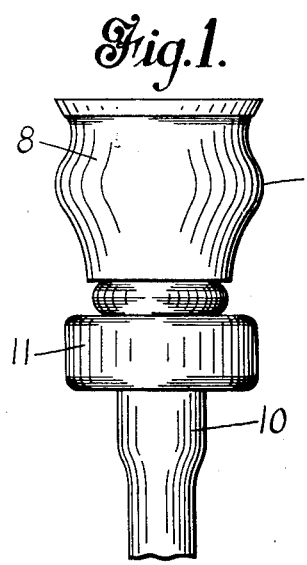
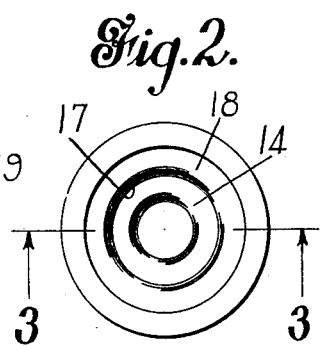
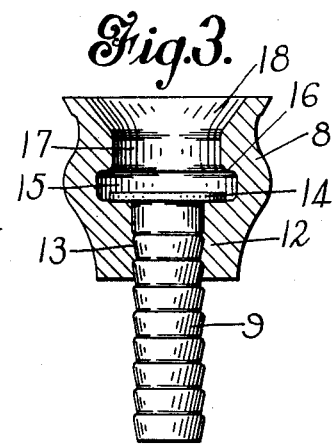
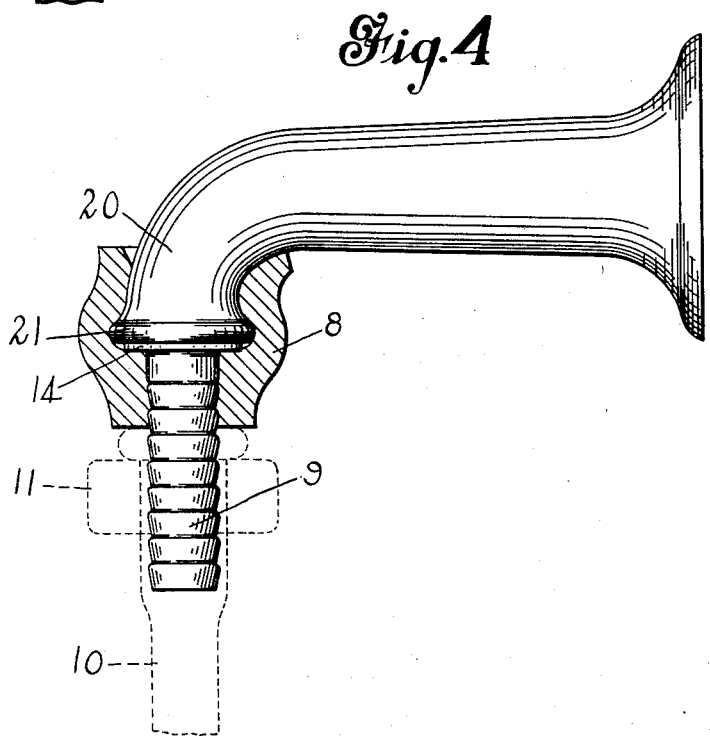
Inventor
John W. Patterson
By Rockwood & Bartholow
Attorneys

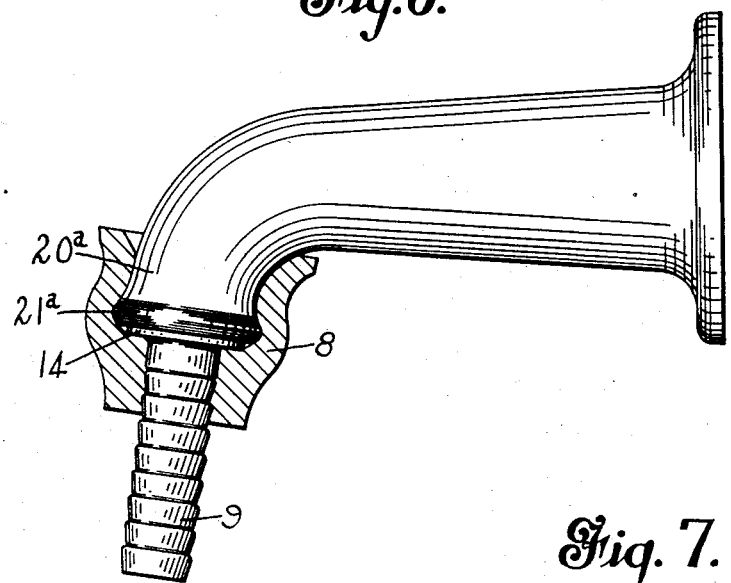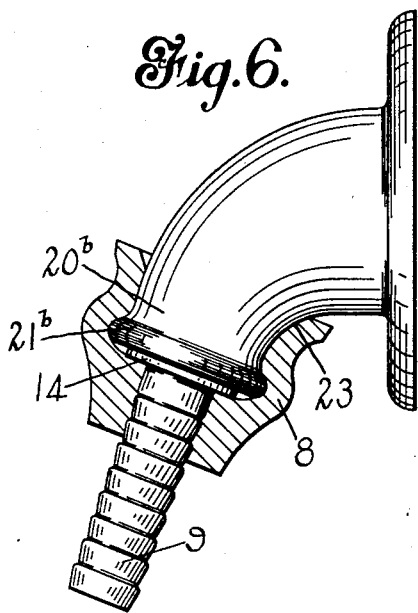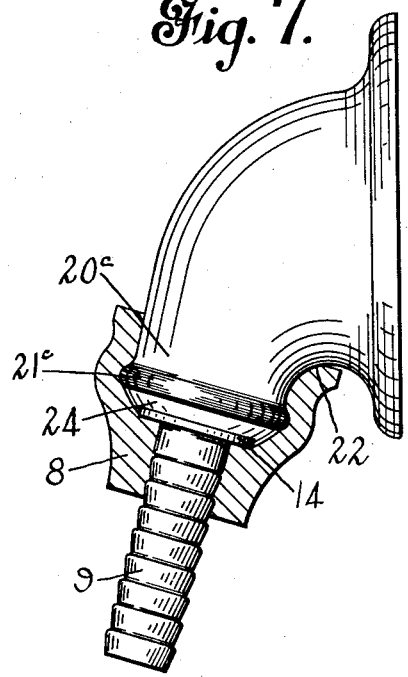

Patented Aug. 8, 1933

1,921,094

UNITED STATES PATENT OFFICE 1,921,094

BATH SPRAY OR LIKE CONNECTER

John W. Patterson, New Haven, Conn., assignor to The Seamless Rubber Company, Incorporated, New Haven, Conn., a Corporation of Massachusetts Application March 7, 1932. Serial No. 597,300

4 Claims. (Cl. 285—163)

This invention relates to bath spray or like connecters and more especially to a connecter primarily designed for connecting a rubber bath spray hose of relatively small diameter to a large tub outlet or bibb.

In my Patent No. 1,429,766 I have disclosed a form of hose connection for bath sprays whereby the end of the rubber tube or hose can be effectively secured to the nipple of a bath tub faucet. In that case the nipple is comparatively small and of a size to receive the end of the rubber tube.

One of the objects of my present invention is to provide a satisfactory form of adapter by means of which the spray tube can be used on larger faucets or outlets and which is applicable to tub outlets which within certain limits vary in size or shape, or both size and shape.

It had been proposed heretofore to use faucet adapters which can be applied to faucets of different shapes and sizes, but in so far as I am aware these articles have not been very satisfactory. Prior devices have failed to achieve the desired ends and each has possessed important drawbacks and disadvantages which heretofore have not been remedied.

In an article of this character it is important to have a strong connection between the adapter and the faucet, so that the former will not be forced off by the pressure of water, and of course it is desirable to provide an adapter which will be leak-proof and will hold on securely when applied to faucets of different styles and sizes. The adapter should be simple and rugged and should be applicable in a successful manner to several different sizes and shapes of outlets; it should be capable of being slipped readily into position on faucet ends even when they are quite large in diameter; the gripping element for holding the adapter on the faucet should be strong and capable of exerting a very considerable amount of holding and sealing force; the gripping element should be capable of gripping the faucets in different ways (as required by the differences in the sizes and shapes of the faucets) while maintaining the security of the connection in all cases; and the rubber body of the adapter should be short, i. e., of relatively small height so that it can be used effectively even on those relatively small-diametered bibbs in which the downturned portion of the spout is very short.

One of the objects of my invention is to furnish a faucet adapter which satisfactorily meets the above-named conditions, but it will be understood, of course, that my invention is not limited to a structure in which all these features are combined.

Another object is to furnish an adapter which is especially effective with large-sized tub outlets.

To these and other ends the invention consists in the novel features and combinations of parts to be hereinafter described and claimed.

In the accompanying drawings:

Fig. 1 is a side elevation of a bath spray connecter or adapter embodying my improvements showing the rubber tube of the spray secured to the lower end of the adapter.

Fig. 2 is a top plan view of the adapter.

Fig. 3 is a section on line 3—3 of Fig. 2; and

Figs. 4 to 7 are sectional views showing the adapter applied to different tub outlets with which it can be used.

In the drawings the body of the adapter is shown at 8 and the discharge nipple which preferably forms a part thereof is indicated at 9, said nipple being secured in the bottom wall of the adapter body and projecting downwardly therefrom. The rubber bath spray tube is indicated at 10, and this tube in the form shown is adapted to be locked in embracing relation to the nipple 9 by a clincher ring 11, of the type shown in my patent previously mentioned.

The adapter body 8 is preferably made of rubber and is generally cup-shaped in form, having an open flaring upper end, a thick bottom, and a relatively heavy side wall. The thick bottom, which is indicated at 12, has a bore 13 therein to receive and frictionally hold the nipple 9, which nipple has a lateral flange 14 at the upper end thereof overlying the bottom of the cup-shaped body around the edge of the bore 13 and adapted to prevent the nipple from being displaced in an outward direction relatively to the body. The body 8 is preferably quite short and has a comparatively thick side wall and preferably the open chamber in the body is located for the most part at the upper part of the body, with a considerable amount of rubber extending around the nipple beneath the flange thereof, as shown in Fig. 3. Preferably the bottom surface of the body which is contacted by the flange 14 is flat and of slightly larger diameter than the flange, and the flange 14 is located in a laterally enlarged portion 15 of the chamber. Above the chamber portion 15 the side wall of the body is of increased thickness so as to create an inwardly projecting shoulder 16 on said wall, and above the shoulder 16 the chamber is of reduced diameter, as shown at 17, the thickness of the side wall of the chamber portion 17 being preferably somewhat greater than the thickness of the side wall of the chamber portion 15. The inner surface of the chamber portion 17 is preferably cylindrical and the shoulder 16 is preferably slightly rounded, as shown in Fig. 3. The chamber portion 17 opens to the upper end of the adapter body by way of a mouth portion 18 of flaring shape forming a funnel-shaped entrance to the chamber in the body.

Preferably the body 8 has an annular bulge 19 midway of its ends substantially in horizontal alinement with the laterally enlarged lower portion of the chamber or socket in the body. Above the laterally enlarged chamber portion is an inwardly and laterally extending overhanging thick upright wall portion adapted to exert a very strong gripping force upon a faucet, and this thick wall portion has at its lower end where the wall is undercut a downwardly facing shoulder. The mouth portion of the body is preferably enlarged on an incline by slanting the inner surface of the body upwardly and outwardly from the upper margin of the narrow chamber portion 17. Preferably the outer contour of the body will be substantially as shown in Fig. 1, where the outer diameter is reduced respectively below and above the bulge or convex curve 19, there being slight annular concavities above and below the bulge, but of course some variation may be made in this as in other respects. Preferably the upper edge portion of the body wall which forms the mouth of the body is comparatively thin so that the rim of the body is more flexible than the intermediate part of the wall. Where the flared mouth recess 18 is provided, the side wall of the body is inclined generally in an upward and outward direction, and preferably this wall portion is gradually thinned down toward the edge and is substantially thinner than the side wall portion defining the chamber 17.

In Fig. 4 I have shown the adapter applied to a tub outlet or bibb whose spout is of relatively large diameter as compared to the nipple 9. In this case the discharging portion of the spout directs the water downwardly substantially in a vertical direction. Fig. 5 shows the adapter applied to an outlet the discharging portion of whose spout is somewhat differently arranged in that it directs the water downwardly at a slight angle, the curve at the down-turned end of the spout being somewhat more gradual. Figs. 4 and 5 show the appliance fitted to rather long spouts, but in Fig. 6 the adapter is applied to a shorter and thicker spout. It will be observed, for example, that the discharge mouth of the bibb shown in Fig. 6 is of greater diameter than that shown in Fig. 5, and that the spout is thicker and shorter than that shown in Fig. 5 and turned at a somewhat different angle. The spout shown in Fig. 7 has a discharge mouth still larger than that shown in Fig. 6, and here the spout is very short and the underneath curve quite sharp, and yet the adapter can be successfully applied.

In applying the adapter to the spout shown in Fig. 4, for example, where the down-turned end 20 of the spout has the usual bead 21 at the rim thereof, the mouth of the body is placed against the bead, preferably with the adapter body slightly canted with respect to the discharge mouth of the spout, and the adapter forced over the spout end. In this operation the movement of the adapter body into position is facilitated by the flaring mouth of the adapter body, whose inner beveled surface contacts with the exterior surface of the bead, and as the adapter body continues its movement upwardly relatively to the spout the thick wall portion of the body which projects inwardly is slightly compressed and the body then snaps into place on the spout with the bead located beneath shoulder 16 in chamber 15. In this position of the parts, as shown in Fig. 4, the discharge mouth of the spout is alined with and practically in contact with the inlet opening of nipple 9, and in the case illustrated the mouth of the spout lies against the upper face of the nipple flange 14. The bead 21 somewhat expands the chamber 15 and compresses the rubber in the shoulder 16 and causes the wall of the embracing rubber body to conform closely and very snugly to the exterior surface of the bead, and above the bead the thick body wall is somewhat compressed by the adjacent portion of the spout, although in this case this portion of the wall is not compressed to such a great degree as in some other cases. It will be observed that the tightly adhering rubber body fitting the exterior surface of the bead and against a substantial portion of the spout 20 located above the bead will not only prevent leakage of water upwardly about the spout, but will hold the adapter body very tightly and securely on the spout as a result of the stretching of the thick rubber wall so that even with a very high water pressure there will be no likelihood of the connecter being displaced or forced off the spout.

When used with a spout such as shown in Fig. 5, the action is substantially the same as just described, the character of the adapter body being such that it will fit the spout shown in Fig. 5 in addition to the one shown in Fig. 4, notwithstanding the fact that the spout portion immediately above the bead 21ª shown in Fig. 5 and indicated at 20ª is of different shape and of noticeably larger diameter than the corresponding part of the spout shown in Fig. 4. Here the body of the adapter is stretched laterally to a greater degree above the bead than in the case shown in Fig. 4, and there is a somewhat greater lateral gripping action above the bead while at the same time the gripping force acting in the direction of the axis of the adapter and exerting downward pressure on the bead to hold the spout against flange 14 is somewhat less than in the case first described. In the case shown in Fig. 6, the bead 21ᵇ is of larger diameter than the bead 21ª, and the spout portion 20ᵇ is of greater diameter than spout portion 20ª and somewhat differently curved. In this case there is even greater inward and lateral gripping effect on spout portion 20ᵇ, owing to the fact that the wall of the body is stretched to a greater extent by this portion of the spout and the engagement of the large-diametered bead 21ᵇ in recess or chamber 15 causes this portion of the body to be distended more and the shouldered wall portion of the body to be further compressed than in the cases previously described. Here the gripping force on the bead axially of the adapter is less than in the cases previously described, but this is compensated for by the increased lateral stretching and lateral gripping effect in the wall portion surrounding the bead and the spout portion above the bead.

In the case shown in Fig. 7, the bead 21ᶜ is of even greater diameter than bead 21ᵇ, and the neck portion 20ᶜ of the spout is of larger diameter than neck portion 20ᵇ, and in addition, the spout at the underneath portion thereof makes a turn at 22 on a radius which is much shorter than that of the curve 23 shown in Fig. 6. In this case the neck portion 20ᶜ is so short that the adapter cannot be forced upwardly farther than the position shown in Fig. 7, and there remains in this case a space 24 between the bead 21ᶜ and the floor of the adapter body, as the bead does not contact in this instance with the nipple flange 14. Nevertheless, the appliance serves very satisfactorily with an outlet of this type. Where the adapter is to be applied to such a large spout, it is advisable usually to wet the mouth portion of the adapter body before it is forced against the spout because this considerably facilitates the slipping of the flared rubber mouth over the large spout end, but this is an operation which can be readily performed without the expenditure of any great amount of muscular effort. When the rubber body has been forced onto a spout such as shown in Fig. 7, it is very securely held against dislocation because the rubber wall has a very strong lateral grip on the spout and because the rubber wall tightly engages with the spout in the region at the bead and the region above the bead. Of course this tight engagement of the rubber body against the exterior surface of the bead and against the neck portion of the spout above the bead makes a connection which is proof against any leakage of water.

It will be apparent from the foregoing description that in my improved adapter I do not attempt to provide in the rubber adapter body a plurality of seats for difference faucet ends which are of different diameters and which are separate from each other and spaced apart at different points lengthwise of the adapter, but that, on the other hand, one of my aims is to provide a relatively short adapter body in which a number of different sizes and/or shapes of faucet ends can be accommodated and in which the different faucet ends occupy the same or substantially the same position longitudinally of the adapter body. This, of course, is true of the examples shown in Figs. 4, 5 and 6 of the drawings, and in the case shown in Fig. 7 the adapter is only displaced slightly in a longitudinal direction as compared to the position shown in Fig. 6, for example. In all of the cases herein shown for purposes of illustration, the wall of the body is adapted to exert gripping force on the spout in a region spaced upwardly from the floor of the body only to a slight extent. It will be observed further that for holding the appliance on the spout my main reliance is upon a relatively thick resilient rugged wall of rubber which is placed under stretch when the rubber body is forced over the spout, as above explained, and that this thick rubber wall conforms closely to the spout bead and to the neck portion of the spout above the bead. That portion of the rubber wall which engages the neck portion of the spout above the bead can be quite short, or, in other words, of small vertical dimension, and this enables me to use the appliance successfully with bibbs that have very short spout portions.

In the form shown, the upper open or chambered part of the adapter body is of less height than the diameter of the bead-receiving groove 15, or, in other words, the chamber in the body is wider than it is high; and the vertical dimension of the groove 15 is materially less than the distance from the upper margin of the groove to the upper end of the body. The wall of the body is shaped to conform to and grip the rounded terminal bead of the faucet, and above the bead of the faucet the wall of the body has a short curve to conform to and grip the short curve of the faucet. At the mouth portion of the body the wall of the body which leads to the relatively thin flexible rim is located at an angle to the longitudinal axis of the body.

It will be obvious that while the form of adapter body herein particularly described is the preferred form, various changes may be made in the details of structure without departing from the scope of my invention as defined in the claims.

What I claim is:

1. The combination with a faucet having a down-turned discharge end, the discharge extremity having a rounded exterior bead and said faucet having above the bead a short curved portion, of an elastic adapted body having an interior chamber open at the top and an opening through the bottom thereof, a nipple extending through the bottom opening of said body and provided with a flange on the floor of the interior chamber of the body, the wall of said body conforming to and gripping the faucet bead and the curved portion of the faucet above the bead, said wall having a shoulder projecting interiorly therefrom which holds the end of the faucet against the nipple flange.

2. As a means for connecting a bath spray tube or the like to a faucet having a down-turned discharge end, the extremity of said faucet having a rounded annular bead and the faucet body having a short curve above the bead, an elastic adapter body having an interior chamber and provided with an opening through the bottom thereof, the wall of said chamber being sufficiently thin to permit substantial expansion thereof and having a narrow interior groove so that it conforms to and grips the bead and having a portion above said groove gripping the curved portion of the faucet, said narrow groove being located adjacent the floor of the chambered portion of the body and the wall of the body holding the faucet end substantially in contact with the floor of the body.

3. As a means for connecting a bath spray tube or the like to a faucet having a down-turned discharge end, the extremity of said faucet having a rounded annular bead, an elastic adapter body having an interior chamber in which the discharge end of said faucet is received, the lower portion of said chamber being in the form of a groove the wall of which is curved so that it conforms to and grips the bead, the wall of the chamber above said groove being shaped to conform to and grip the curved portion of the faucet above the bead thereof, and a nipple leading downwardly from said chamber out of the body, said groove being of substantially less vertical dimension than the distance from the upper end of the body to the upper margin of the groove, and the wall of the chamber being sufficiently thin to permit substantial expansion thereof.

4. A faucet adapter comprising an elastic cup-shaped body having an interior chamber open at the top of the body, said body having a funnel-shaped mouth portion provided with a beveled inner surface, the wall of the mouth portion being directed at an angle to the axis of the body and being thinner and more flexible at the free edge portion than at the base portion, the chambered interior of said body comprising a laterally enlarged curved bead-gripping portion whose diameter is greater than the distance from the bottom of the chamber to the upper end of the body, the walls of the chamber being sufficiently thin to permit substantial expansion thereof so that the adapter can effectively grip beaded faucets of different sizes and shapes.

JOHN W. PATTERSON.